United States Patent Office 3,819,819
Patented June 25, 1974

3,819,819
ALUMINUM HYDRIDE IN HEXAGONAL OR RHOMBOHEDRAL CRYSTALLINE FORM
Norman E. Matzek, Midland, and Donald F. Musinski, Bay City, Mich., assignors to The Dow Chemical Company, Midland, Mich.
No Drawing. Filed Mar. 8, 1962, Ser. No. 179,509
Int. Cl. C01b 6/00; B01j 17/00
U.S. Cl. 423—645         2 Claims This invention relates to novel compositions, and more particularly, to novel compositions of aluminum hydride.

Heretofore a stable form of solid aluminum hydride has not been isolated. Generally from the method of manufacturing, a solvated aluminum hydride in ether is obtained. This product is in a combined form with the ether forming an etherate from which it is very difficult to separate the aluminum hydride. Heating of the compound does not effect a separation. Before the aluminum hydride can be freed of the ether, it will decompose. A light weight aluminum hydride (hereinafter called gamma-aluminum hydride) has been successfully recovered from the etherate by employing particular solvents such as hexane or certain aromatic solvents. This compound is unstable at room temperature decomposing to its elements, aluminum and hydrogen. The instability of the compound greatly limits its utility.

It is therefore an object of this invention to provide stable forms of solid aluminum hydride.

The novel aluminum hydride compositions, according to this invention, are obtained by subjecting the unstable, gamma-aluminum hydride product described above to treatment under certain conditions. The compositions of this invention are stable at room temperature. One of the compositions has a hexagonal crystal structure (hereafter referred to as alpha-aluminum hydride) with the unit cell dimensions of about $a=4.44\pm.02$ A., $c=5.89\pm.02$ A. The density of this hydride is over 1.4 grams per cubic centimeter. The product is insoluble or sparingly soluble in diethyl ether but is soluble in tetrahydrofuran. It is relatively inert to hydrazine and hydrolyzes slowly in presence of water.

In addition to the above composition, the second novel composition of aluminum hydride is an intermediate between the unstable, light weight gamma-aluminum hydride and the novel alpha-aluminum hydride composition described above. This intermediate aluminum hydride composition (hereinafter referred to as beta-aluminum hydride) has a rhombohedral crystalline structure having unit cell dimensions of about $a=3.18\pm.02$ A., and $$c=15.60\pm.02 \text{ A.}$$

It has an improved stability and may be used as a constituent in rocket fuel. However, the density and the stability are not as favorable for use as a constituent in rocket fuel as the hexagonal crystalline material described above. This rhombohedral crystalline material has an unusual property compared to other forms of aluminum hydride in that it is soluble in ether. Thus, this material can be used as an intermediate for the preparation of the more favorable composition or as a reactant in ether solutions.

The novel compositions may be conveniently prepared by desolvation and conversion of freshly prepared ether solvated aluminum hydride. It is generally preferred to prepare the solvated material just prior to the treatment of this material for the desolvation and conversion to the novel compositions. In the preparation of the solvated material generally aluminum chloride is reacted with lithium aluminum hydride in diethyl ether diluent in an inert atmosphere. To desolvate the aluminum hydride etherate, the etherate is intermixed with a complex hydride, such as lithium borohydride, sodium borohydride, sodium aluminum hydride, or lithium aluminum hydride. Generally the amount of complex hydride used is such that there is from ¼ to 1 mole of the complex hydride present for every mole of aluminum hydride. Intermixing of the complex hydride with the freshly prepared aluminum hydride etherate will result in desolvating of the etherate and the formation of the unstable form of gamma-aluminum hydride. While the gamma-aluminum hydride may be obtained by intermixing the etherate with the complex hydride at room temperature, it is preferred to heat the mixture for from ½ to 2 hours at a temperature of 40° C. to 75° C. to increase the rate of formation of the gamma-aluminum hydride. The gamma-aluminum hydride obtained above is then heated further in the presence of the complex hydride for from ¼ to 24 hours at a temperature in the range of 45° to 140° C., preferably from 65° to 75° C. to obtain the hexagonal crystalline alpha-aluminum hydride. After the heat treatment, the final product obtained is then washed with a solvent to remove the complex hydride present in the final product. Upon removal of the complex hydride, the hexagonal or alpha-aluminum hydride product is obtained.

To obtain the rhombohedral or beta-aluminum hydride, it is generally preferred to intermix an alkali metal borohydride such as lithium borohydride or sodium borohydride as the complex hydride with the gamma-aluminum hydride and heat the mixture at a temperature of from 60° to 75° C. for from 1 to 2 hours. When the borohydride is used as the complex hydride, a major portion of the gamma-aluminum hydride is converted to beta-aluminum hydride by heating for the above length of time. With complex hydrides other than the borohydrides, beta-aluminum hydride may also be formed as an intermediate product before the gamma-aluminum hydride is converted to the alpha form but only a small amount of the beta-aluminum hydride is obtained in the product at any one time. It appears that with other than the borohydrides the gamma-aluminum hydride is converted directly to the alpha-aluminum hydride upon heating or at such a rate that only small amount of the beta-aluminum hydride is present in the product.

The following examples further illustrate the preparation of the novel compounds and their utility.

EXAMPLE I

In a flask, 0.05 mole of aluminum chloride was reacted with 0.200 mole of lithium aluminum hydride in a diethyl ether solvent under a nitrogen atmosphere. The aluminum chloride was dissolved in the diethyl ether and then added to the lithium aluminum hydride as the mixture was being agitated. The mixture was stirred for about 2 minutes after which the lithium chloride formed by the reaction was removed by filtration. The ether was then removed from the filtrate by vaporization under a pressure of approximately 10 millimeters of mercury. The mixture of aluminum hydride etherate and the unreacted lithium aluminum hydride thus obtained, was transferred to a stirrer-equipped flask and placed in a temperature controlled bath at a temperature of about 65° C. under a reduced pressure.

A sample taken after 1 hour of heat treatment was washed with diethyl ether to remove the complex hydride and found to be gamma-aluminum hydride. The X-ray powder diffraction pattern of the gamma-aluminum was as follows:

TABLE I

X-Ray Powder Diffraction Data of Gamma Aluminum Hydride

| d: | $I/I_1$ | d: | $I/I_1$ |
|---|---|---|---|
| 4.55 | 30 | 1.61 | 4 |
| 4.33 | 63 | 1.545 | 10 |
| 3.93 | 18 | 1.525 | 25 |
| 3.69 | 75 | 1.51 | 3 |
| 3.48 | 50 | 1.48 | 7 |
| 3.02 | 50 | 1.45 | 7 |
| 2.88 | 100 | 1.438 | 8 |
| 2.68 | 25 | 1.419 | 8 |
| 2.40 | 30 | 1.398 | 9 |
| 2.31 | 75 | 1.361 | 4 |
| 2.26 | 25 | 1.336 | 15 |
| 2.08 | 40 | 1.302 | 3 |
| 1.96 | 2 | 1.288 | 3 |
| 1.85 | 5 | 1.230 | 8 |
| 1.80 | 5 | 1.218 | 4 |
| 1.75 | 13 | 1.166 | 5 |
| 1.73 | 8 | 1.152 | 4 |
| 1.705 | 18 | 1.108 | 5 |
| 1.66 | 10 | | |

In the above table "d" represents the interplanar spacings of the planes in A. based upon Miller indices and "$I/I_1$" is the relative line intensity compared to the strongest line based at 100.

After the sample was taken, the remainder of the product was heated for an additional 14 hours. The final product obtained after 15 hours of heating was washed, in an inert atmosphere, with diethyl ether to remove the lithium aluminum hydride. The product thus obtained was dried under reduced pressure and upon analysis was found to consist substantially of the hexagonal type or alpha-aluminum hydride. The product obtained was analyzed by X-ray diffraction. The powder pattern obtained is shown in Table II below where "d" is the interplanar spacing and "$I/I_1$" is the relative intensity as defined in Table I above.

TABLE II

[X-ray powder diffraction data for alpha aluminum hydride]

| Miller indices | d(obs.)A. | $I/I_1$ |
|---|---|---|
| 100 | 3.85 | 10 |
| 101 | 3.22 | 100 |
| 102 | 2.34 | 25 |
| 110 | 2.22 | 19 |
| 003 | 1.965 | 4 |
| 201 | 1.825 | 11 |
| 202 | 1.607 | 11 |
| 004 | 1.469 | 17 |
| 113 | 1.469 | 17 |
| 211 | 1.410 | 11 |
| 104 | 1.374 | 6 |
| 203 | 1.374 | 6 |
| 212 | 1.300 | 7 |
| 300 | 1.280 | 4 |
| 204 | 1.166 | 2 |
| 213 | 1.166 | 2 |
| 105 | 1.126 | 2 |
| 220 | 1.110 | 2 |
| 303 | 1.072 | 3 |
| 311 | 1.048 | 3 |
| 214 | 1.034 | 3 |
| 205 | 1.002 | 3 |
| 312 | 1.002 | 3 |
| 006 | 0.982 | 0.5 |
| 304 | 0.965 | 2 |
| 223 | 0.965 | 2 |
| 401 | 0.948 | 1 |
| 215 | 0.914 | 2 |
| 402 | 0.914 | 2 |
| 116 | 0.897 | 1 |
| 321 | 0.871 | 1.5 |
| 314 | 0.863 | 1.5 |
| 403 | 0.863 | 1.5 |
| 232 | 0.843 | 1.5 |
| 007 | 0.843 | 1.5 |
| 410 | 0.837 | 1.5 |

The density of alpha-aluminum hydride calculated from the X-ray diffraction was found to be about 1.49 gm./cc. and found to have 3 molecules per unit cell. The product had a hexagonal crystalline structure having a unit cell of about $a=4.44$ A. and $c=5.89$ A.

The alpha-aluminum hydride, a white solid, was substantially insoluble or only sparingly soluble in diethyl ether. It was soluble in tetrahydrofuran and was inert to hydrazine. On exposure to water it hydrolyzed very slowly, requiring hours to completely hydrolyze it. The material was stored at room temperature for 135 days. It remained stable during this time and showed no decrease in reactivity.

The alpha-aluminum hydride was used as a fuel in a solid rocket propellant. It was intermixed with ammonium perchlorate and a suitable binder to form a solid propellant. The propellant was fired satisfactorily in a static motor. The calculated specific impulse from such a firing is found to be in the range of 295 to 300.

EXAMPLE II

Beta-aluminum hydride was prepared in a manner similar to that described in Example I.

To a flask, 0.02 mole of aluminum chloride was reacted with 0.08 mole of lithium aluminum hydride in a diethyl ether solvent under a nitrogen atmosphere. The lithium chloride formed by the reaction was removed immediately by filtration and the filtrate added to an ether solution containing 0.04 mole of lithium borohydride. The ether was then removed by vaporization under a reduced pressure of approximately 10 millimeters of mercury. The resulting solid mixture of aluminum hydride etherate, unreacted lithium aluminum hydride, and the added lithium borohydride was heated in a flask at a temperature of about 65° C.

Samples were periodically taken from the flask and analyzed. Based upon the X-ray data, the aluminum hydride present in the sample was found to be in the different forms in about the following amounts:

TABLE III

| | Percent of total AlH₃ | | |
|---|---|---|---|
| Time, hours | Alpha-AlH₃ | Beta-AlH₃ | Gamma-AlH₃ |
| 0 | 0 | 0 | 0 |
| 1 | 0 | 80 | 20 |
| 2 | 10 | 80 | 10 |
| 3 | 35 | 60 | 5 |
| 4 | 55 | 40 | 5 |
| 6 | 75 | 25 | 0 |

From the sample obtained after 2 hours of heat treatment, which by analysis was found to contain about 80 weight percent of the aluminum hydride as beta-aluminum hydride, it was found that the beta-aluminum hydride had an X-ray powder diffraction pattern as shown below where "d" is the interplanar spacing and "$I/I_1$" is the relative intensity as defined above:

TABLE IV

X-Ray Powder Diffraction Data for Beta-Aluminum Hydride

| d: | $I/I_1$ | d: | $I/I_1$ |
|---|---|---|---|
| 5.25 | 100 | 1.59 | 17 |
| 2.71 | 53 | 1.372 | 11 |
| 2.60 | 53 | 1.356 | 13 |
| 2.49 | 11 | 1.259 | 12 |
| 2.21 | 13 | 1.213 | 8 |
| 1.73 | 33 | | |

The beta-aluminum hydride had a rhombohedral crystalline structure having a cell dimension of about $a=3.18$ A., and $c=15.60$ A. It was soluble in diethyl ether and tetrahydrofuran. It hydrolyzed somewhat more rapidly than alpha-aluminum hydride in presence of water.

The product was stored 26 days at ambient temperature without appreciable decomposition. The product after the above storage was suitable as a fuel for propellants using aluminum perchlorate as an oxidant.

The sample taken after 6 hours of heat treatment was washed with ether to remove the lithium borohydride and the lithium aluminum hydride. The product remaining was substantially alpha-aluminum hydride having an X-ray diffraction pattern equivalent to that given in Table II.

What is claimed is:

1. A hexagonal crystalline aluminum hydride having a unit cell dimension of about $a=4.44\pm.02$ A. and $c=5.89\pm.02$ A. determined by an X-ray diffraction powder pattern, a density of greater than about 1.4 grams per cubic centimeter and a characteristic X-ray powder diffraction pattern corresponding to

| d: | $I/I_1$ | d: | $I/I_1$ |
|---|---|---|---|
| 3.85 | 10 | 1.374 | 6 |
| 3.22 | 100 | 1.300 | 7 |
| 2.34 | 25 | 1.280 | 4 |
| 2.22 | 19 | 1.166 | 2 |
| 1.965 | 4 | 1.126 | 2 |
| 1.825 | 11 | 1.110 | 2 |
| 1.607 | 11 | 1.072 | 3 |
| 1.469 | 17 | 1.048 | 3 |
| 1.410 | 11 | 1.034 | 3 |
| 1.002 | 3 | 0.897 | 1 |
| 0.982 | 0.5 | 0.871 | 1.5 |
| 0.965 | 2 | 0.863 | 1.5 |
| 0.948 | 1 | 0.843 | 1.5 |
| 0.914 | 2 | 0.837 | 1.5 |

2. A rhombohedral, crystalline aluminum hydride prepared by desolvation and conversion of freshly prepared ether solvated aluminum hydride wherein said ether solvated aluminum hydride is intermixed with an alkali metal borohydride thereby to desolvate said aluminum hydride and heating said desolvated aluminum hydride in the presence of said alkali metal borohydride at a temperature of from about 60 to about 75° C. for about 1 to 2 hours thereby to prepare said rhombohedral crystalline aluminum hydride having unit cell dimensions $a=3.18\pm.02$ A. and $c=15.6\pm.02$ A. and a characteristic X-ray powder diffraction pattern corresponding to

| d: | $I/I_1$ | d: | $I/I_1$ |
|---|---|---|---|
| 5.25 | 100 | 1.59 | 17 |
| 2.71 | 53 | 1.372 | 11 |
| 2.60 | 53 | 1.356 | 13 |
| 2.49 | 11 | 1.259 | 12 |
| 2.21 | 13 | 1.213 | 8 |
| 1.73 | 33 | | |

References Cited

FOREIGN PATENTS 785,348  10/1957  Great Britain.

OTHER REFERENCES

Rice, Non-solvated Aluminum Hydride, P.B. Report 127,687, Aug. 1, 1956.

Hackh's Chemical Dictionary, 3rd ed., 1944.

LELAND A. SEBASTIAN, Primary Examiner

U.S. Cl. X.R.

23—300, 305; 149—76